United States Patent
Jouper

(10) Patent No.: US 10,164,545 B2
(45) Date of Patent: Dec. 25, 2018

(54) POWER DISTRIBUTION SYSTEM FOR LOW-FREQUENCY AC OUTLETS

(71) Applicant: Astronics Advanced Electronics Systems Corp., Kirkland, WA (US)

(72) Inventor: Jeffrey A. Jouper, Newcastle, WA (US)

(73) Assignee: Astronics Advanced Electronic Systems Corp., Kirkland, WA (US)

( * ) Notice: Subject to any disclaimer, the term of this patent is extended or adjusted under 35 U.S.C. 154(b) by 258 days.

(21) Appl. No.: 14/273,139

(22) Filed: May 8, 2014

(65) Prior Publication Data

US 2015/0326134 A1 Nov. 12, 2015

(51) Int. Cl.
| | |
|---|---|
| *B60L 1/00* | (2006.01) |
| *B60L 3/00* | (2006.01) |
| *H02M 5/04* | (2006.01) |
| *H02M 1/44* | (2007.01) |
| *H02J 3/00* | (2006.01) |
| *B60R 16/02* | (2006.01) |
| *H02M 5/22* | (2006.01) |
| *H02M 5/27* | (2006.01) |

(Continued)

(52) U.S. Cl.
CPC .............. *H02M 5/04* (2013.01); *B60R 16/02* (2013.01); *B64D 11/06* (2013.01); *H02J 3/00* (2013.01); *H02J 3/006* (2013.01); *H02J 3/14* (2013.01); *H02M 1/44* (2013.01); *H02M 5/225* (2013.01); *H02M 5/27* (2013.01); *B64D 2221/00* (2013.01)

(58) Field of Classification Search
CPC ..... G06F 1/26; H02J 3/006; H02J 4/00; H02J 3/00; H02M 5/225; H02M 5/27; H02M 5/04; H02M 1/44; B60R 16/00
See application file for complete search history.

(56) References Cited

U.S. PATENT DOCUMENTS

| | | | | |
|---|---|---|---|---|
| 3,500,056 A | * | 3/1970 | Riley | .................... H01R 13/642 307/13 |
| 4,611,190 A | * | 9/1986 | Montague | ............... H01F 30/12 336/10 |
| 5,754,445 A | | 5/1998 | Jouper et al. | |

(Continued)

FOREIGN PATENT DOCUMENTS

EP 2273645 A2 1/2011

OTHER PUBLICATIONS

API Technologies Corp., EMI Power Filter Solutions, Jan. 2013.
(Continued)

*Primary Examiner* — Rexford Barnie
*Assistant Examiner* — Toan Vu
(74) *Attorney, Agent, or Firm* — Wiggin and Dana LLP; Gregory S. Rosenblatt; Jonathan D. Hall

(57) ABSTRACT

A power distribution system in which a power source is configured to supply an amount of high-frequency input power to a centralized frequency converter unit. The centralized frequency converter unit is configured to convert the high-frequency input power into low-frequency converted power. Passenger Electronic Device Controllers receive the converted power and distribute it to outlet units. Power management functions may be integrated with the distribution system. For instance, the centralized frequency converter unit can cause to be disabled unused outlet units when the power drawn by the used outlet units exceeds a predetermined threshold.

21 Claims, 3 Drawing Sheets

(51) Int. Cl.
*H02J 3/14* (2006.01)
*B64D 11/06* (2006.01)

(56) References Cited

U.S. PATENT DOCUMENTS

| | | | | |
|---|---|---|---|---|
| 6,018,203 | A * | 1/2000 | David | H02J 3/14 307/18 |
| 6,466,468 | B1 * | 10/2002 | York | H02M 1/4208 363/65 |
| 2003/0197428 | A1 * | 10/2003 | Hatton | H02J 9/062 307/82 |
| 2006/0081616 | A1 * | 4/2006 | Schuler | F24C 7/087 219/625 |
| 2010/0327771 | A1 * | 12/2010 | Schlenk | H05B 41/2828 315/294 |
| 2011/0010017 | A1 * | 1/2011 | Jouper | H02J 3/005 700/295 |
| 2011/0254371 | A1 * | 10/2011 | Galsim | G06F 1/263 307/39 |
| 2014/0117753 | A1 | 5/2014 | Pradier et al. | |
| 2015/0123464 | A1 * | 5/2015 | Hess | B64D 11/06 307/9.1 |
| 2016/0054394 | A1 | 2/2016 | Jouper | |

OTHER PUBLICATIONS

Opus, Aviation Electrical Supplies—Safety and Compliance Provisions for Aircraft Ground Support Power Supplies, Jul. 2009.
EP 15166820.9, Extended European Search Report, dated Aug. 10, 2015.

* cited by examiner

POWER DISTRIBUTION SYSTEM FOR LOW-FREQUENCY AC OUTLETS

FIELD OF THE DISCLOSURE

The subject matter of the present disclosure generally relates to power distribution systems, and more particularly relates to centralized conversion of high-frequency alternating current into low-frequency alternating current.

BACKGROUND OF THE DISCLOSURE

The distribution of power among several loads presents certain challenges. This can be particularly true in environments where there is a limited amount of available power, but where hardware complexity and duplication are disadvantageous.

For instance, in commercial aircraft, power having certain characteristics should be supplied simultaneously to numerous consumer power outlets for use in powering personal electronic devices, such as laptops or cellular telephones. Previous aircraft power distribution systems typically involve the distribution of raw aircraft power from a head-end device such as a power management system or circuit breaker, through a side wall disconnect panel to a first seat group. Power is then distributed from the first seat group to additional seat groups through seat-to-seat cabling that carries the power required by seat mounted power conversion units, which in turn provide power to a passenger interface at household voltage and frequency. Power carried through such seat-to-seat distribution networks is often 115 volt alternating current (VAC), three-phase power of either fixed (400 Hz) or variable (360-800 Hz) frequency. Seat power converters are necessary to convert this power to 110 VAC 60 Hz or other voltages to power passengers' electronic devices.

Systems of this type require seat power converters that are suitable for use with an aircraft platform, and thus they preferably have certain capabilities and characteristics, such as power factor correction, a low electromagnetic interference (EMI) signature, low current harmonics and a low load demand variation. Thus, the seat power converters often contain complex circuitry, such as energy storage and filtering devices, to adequately meet these requirements. In addition to the disadvantages inherent in complex circuitry, undesirable heat is generated at the point of conversion by processing power locally at the passengers' seats.

Often, various power management functions are accomplished alongside power distribution. Certain load distribution and management systems (LDMSs) have been previously disclosed. U.S. Pat. No. 5,754,445, titled "Load Distribution and Management System," by Jouper et al. relates to such systems. U.S. Pat. No. 6,046,513, titled "Load Distribution and Management System," by Jouper et al., U.S. Pat. No. 8,295,065, titled "System control by use of phase rotation signaling" by Jouper, and U.S. Pat. App. No. 2012/0,139,341, titled "System control by use of phase rotation signaling," by Jouper, each relate to LDMSs. The disclosures of U.S. Pat. Nos. 5,754,445, 6,046,513, 8,295,065 and U.S. Pat. App. No. 2012/0,139,341 are hereby incorporated by reference herein in their entirety.

The subject matter of the present disclosure is directed to overcoming, or at least reducing the effects of, one or more of the problems set forth above.

BRIEF SUMMARY OF THE DISCLOSURE

Disclosed is a system for the distribution of power to several loads. In an embodiment, a power source supplies high-frequency input power to a Frequency Converter Unit (FCU) that is configured to convert the high-frequency input power into low-frequency converted power. The converted power is distributed to various outlet units through Passenger Electronic Device Controllers (PEDCNTs), each of which is associated with several outlets.

An objective of the disclosed subject matter is to centralize the power conversion process and efficiently distribute the native power required by the passenger electronic devices, without requiring conversion circuitry to be associated directly with seating units.

The subject matter of the present disclosure offers several advantages. For instance in passenger vehicles, distributing 60 Hz power to passenger seating has the advantage of eliminating the need to locally process the power at the seating in order to provide power to end-user devices. Control of power flow to the outlet unit, as well as safety functionality such as ground fault interruption and circuit breaker functionality, can all be accomplished with little power loss at the seat interface. Each seat device does not have to meet all of the power requirements of the aircraft as it is not directly attached to the aircraft power bus. Furthermore, in certain aircraft-based embodiments, the distribution of low-frequency power rather than high-frequency power may not require different power infrastructure in respect to wire sizes and run lengths, particularly because 110 VAC power is very similar in many respects to 115 VAC power.

One advantage of the presently disclosed subject matter is that the size and weight of seat power units and their accompanying hardware are reduced. Weight reduction may be particularly advantageous to aircraft operators, as even small weight savings can lead to increases in aircraft performance, reduced initial capital and maintenance costs, and significant cost savings over the operational life span of the aircraft, particularly from reduced fuel consumption.

BRIEF DESCRIPTION OF THE DRAWINGS

The foregoing summary, preferred embodiments, and other aspects of the present disclosure will be best understood with reference to a detailed description of specific embodiments, which follows, when read in conjunction with the accompanying drawings, in which.

Like reference numbers and designations in the various drawings indicate like elements.

DETAILED DESCRIPTION

Figure 1:
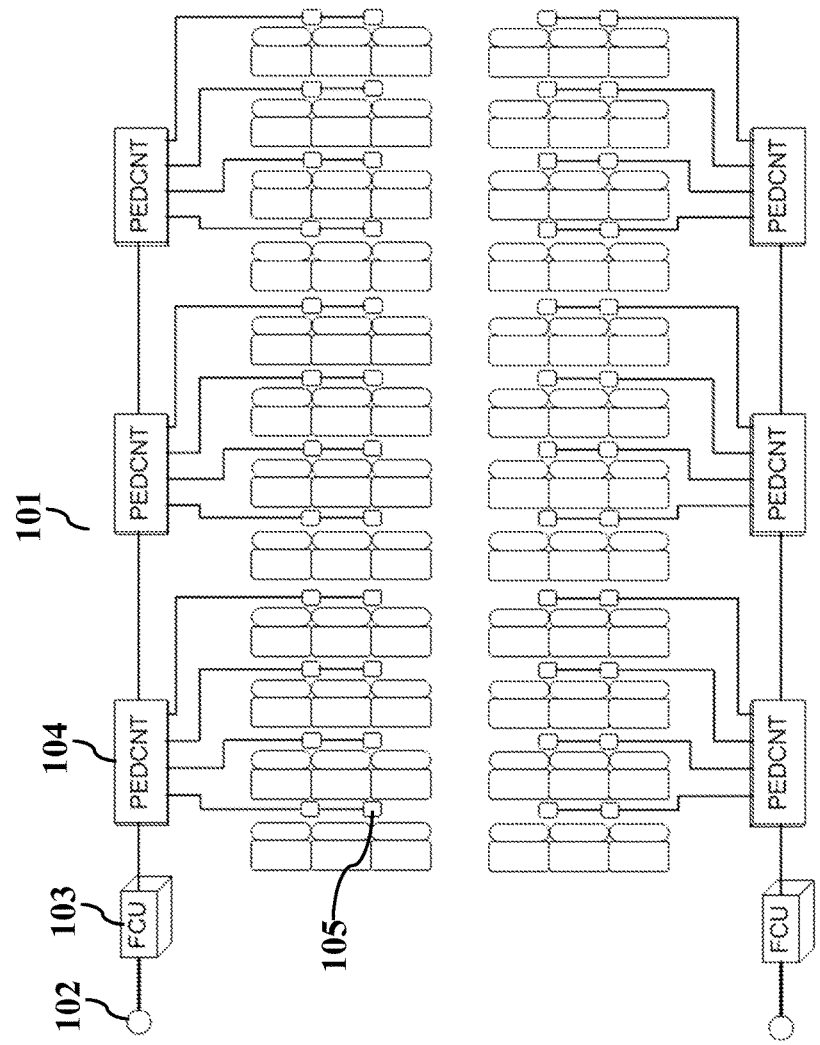
FIG. 1 is a schematic diagram of an embodiment contained within a commercial aircraft.

FIG. 1 is a schematic illustration of an embodiment. Aircraft power distribution and management system 101 has power source 102 that provides high-frequency input power to FCU 103. In the embodiment, power source 102 is a generator driven by an aircraft engine. FCU 103 converts the high-frequency input power into low-frequency converted power. PEDCNTs 104 receive power from FCU 103 and cause it to be distributed to outlet units 105. In the embodiment, outlet units 105 are consumer power outlets located at the passenger seats of the aircraft. PEDCNTs can optionally distribute power to power outlet units through outlet assemblies, which may, for instance, include power switching means for turning an outlet unit "on" or "off."

In the embodiment depicted in FIG. 1, two independent zones are controlled, each with an FCU operating in conjunction with one or more PEDCNTs. In the embodiment, PEDCNTs 104 are depicted as being connected in series to FCU 103, though parallel connection may also be implemented. It should be understood by those of skill in the art to which the present disclosure pertains that the described FCUs and PEDCNTs may be employed in any suitable number or configuration.

High-frequency power as used in the present disclosure refers to current having a frequency inclusive of between 360 and 800 Hz. Low-frequency power as used in the application refers to current having a frequency inclusive of between 50 and 60 Hz.

Specifically, the high-frequency input power may be 115 VAC 400 Hz three-phase power, 115 VAC 360-380 Hz three-phase power, 230 VAC 400 Hz three-phase power or 230 VAC 360-380 Hz three-phase power, and the low-frequency converted power can be 110 VAC 60 Hz three-phase power.

Some embodiments may perform power management functions in addition to distribution functions. For instance, in a situation where additional power is not available, the FCU may be configured to disable unused outlet units so that additional loads are not added to the power system, while still allowing those outlet units that are already drawing power to continue doing so. Thus, disruption to the passengers of a vehicle employing such an embodiment would be reduced, while load management is still accomplished effectively.

Some PEDCNTs of certain embodiments may, in addition to a status whether power is available, make use of additional inputs in determining whether to disable unused outlet units. Power management may thus be accomplished in response to the dynamic circumstances in which an embodiment may operate. For instance, a PEDCNT may disable unused outlets in a decompression situation on an aircraft, thereby conserving power for more critical aircraft systems.

Figure 2:
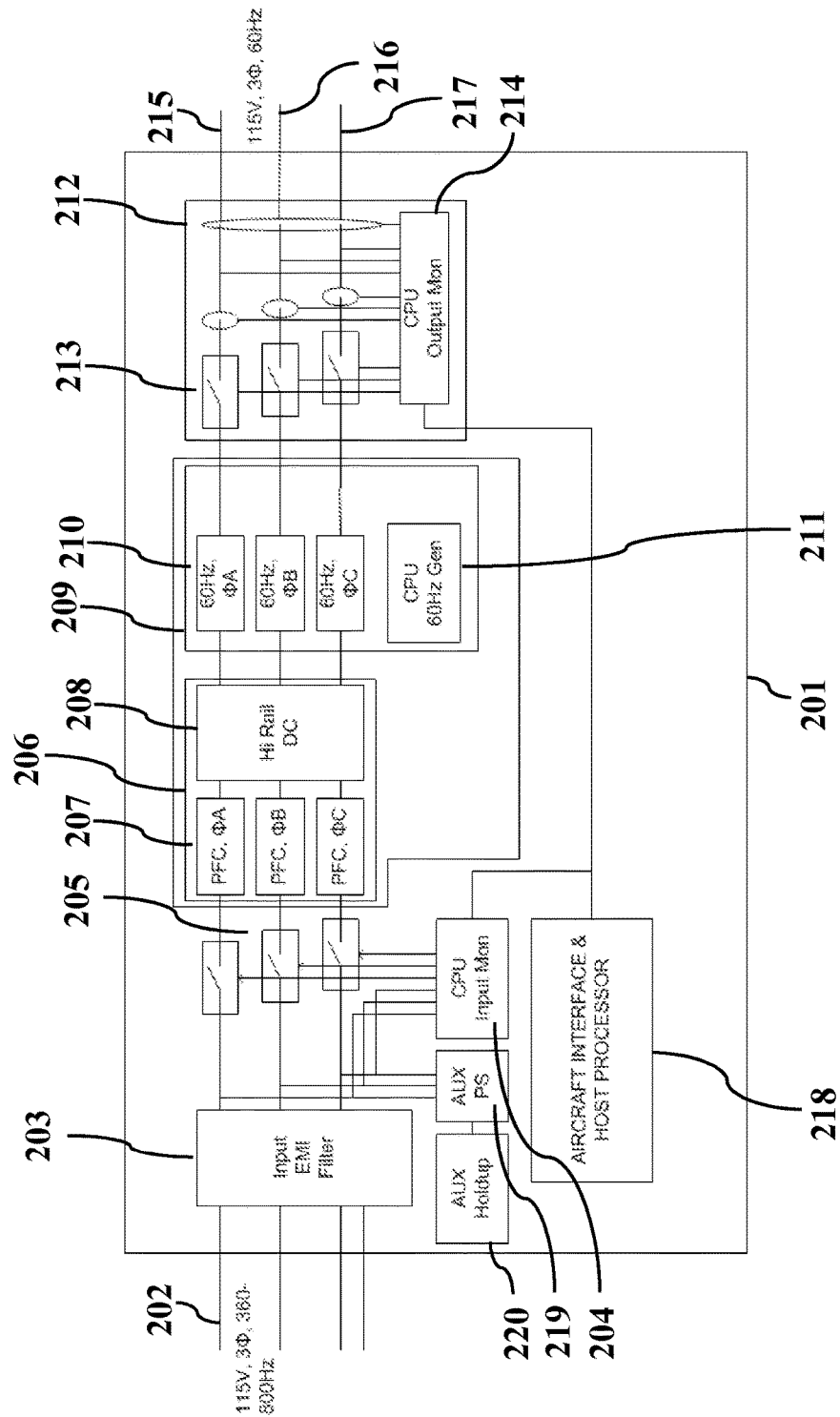
FIG. 2 is a schematic diagram of a centralized frequency converter unit of an embodiment.

FIG. 2 is a schematic diagram of FCU 201 of an embodiment. High-frequency input power is received along input power lines 202 and is fed to EMI filter 203, where electromagnetic filtering is conducted. Switching noise from internal circuits is suppressed and filtered to prevent it from entering back into input power lines 202. FCU central processing unit (CPU) 204 monitors the input power to determine whether it is within the nominal voltage and frequency range (typically 102-122 VAC and 360-380 Hz). When the input voltage is within an allowable range, relays 205 are closed to allow power to flow to three-phase power factor correction (PFC) unit 206. PFC unit 206 corrects for current harmonics and power factor to satisfy aircraft platform requirements. In the embodiment, PFC unit 206 has PFC subunits 207, each of which contributes current at 350 volts potential to the high voltage rail Hi Rail Direct Current Unit 208. This intermediate voltage is used to store energy for short periods of power loss, typically in the range of 1-200 mSec. The intermediate voltage is fed to current inversion unit 209, which consists of 60 Hz AC inverters 210 and inversion CPU 211. Inversion CPU 211 provides a 60 Hz pulse width modulation signal causing inversion unit 209 to output 110 VAC three-phase power. Output control unit 212 has output relays 213 and output CPU 214. Output CPU 214 monitors and controls power flow through output control unit 212. Specifically, output CPU 214 monitors the power used on each phase of the three-phase 60 Hz output power. One phase of power is output over each of power lines 215, 216 and 217. Interface & host processor 218 is configured to provide to output CPU 214 an ON or OFF signal. Auxiliary power supply 219 and auxiliary hold up 220 provide working voltages for the internal circuitry of FCU 201. It will be understood by those of skill in the art to which the present disclosure pertains that various electronic components and circuit designs are suitable for employment within FCU units.

Interface & host processor 218 interprets signals from the other vehicle systems. In an aircraft, information regarding decompression, weight-on-wheels, power availability, and system On/Off status allow FCU 201 to control the system as necessary during various flight phases.

In the embodiment, output CPU 214 monitors the output of FCU 201 and when the power consumed is equal to a preprogrammed system maximum, signals to inversion CPU 211 to the change the phase rotation, for example from phase A, B, C over power lines 215, 216 and 217, to phase A, C, B over power lines 215, 216 and 217. Thus, three-phase power is still output from FCU 201, however, the phase rotation change signals to a PEDCNT downstream that additional power is unavailable and to restrict the use of then unused outlet assemblies.

Figure 3:
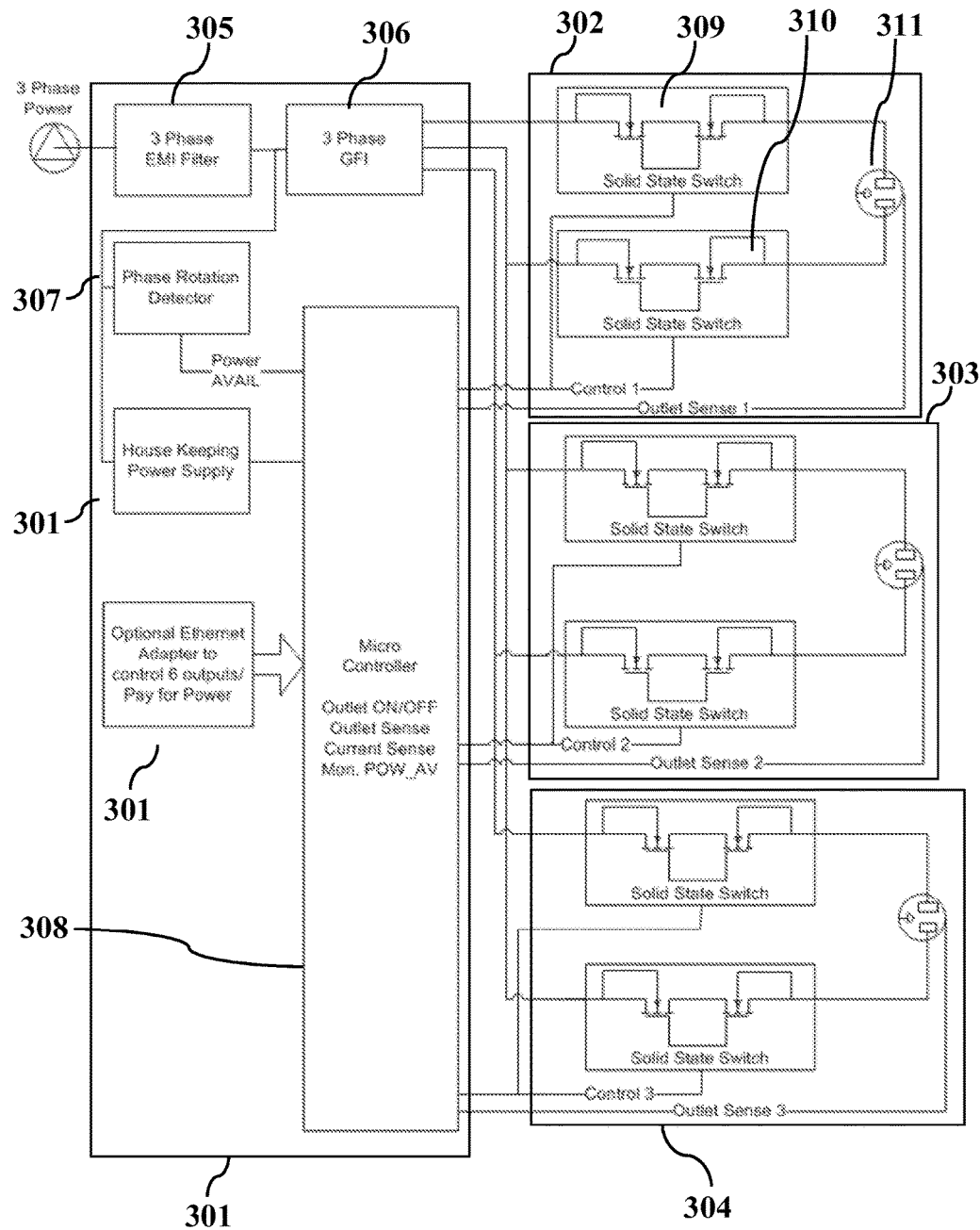
FIG. 3 is a schematic diagram of a passenger electronic device controller of an embodiment.

FIG. 3 is a schematic illustration of a portion of an embodiment including PEDCNT 301, that operates to control outlet assemblies 302, 303, and 304. Three-phase 60 Hz power is fed from a FCU into three-phase EMI filter 305, which removes or suppresses undesirable electromagnetic noise. The resultant power is fed to three-phase ground fault interruption (GFI) unit 306 and to phase rotation detection unit 307. Microcontroller 308 receives a Power AVAIL signal from phase rotation detection 307 when power is available.

The output of three-phase GFI unit 308 is fed to outlet assemblies 302, 303, and 304. The number of outlets attached to the PEDCNT 301 are a design choice and can be a single unit or any plurality. Each outlet unit is fed by two solid state switches, one for each of two phases feeding the outlet. This implementation assumes a three-phase delta power configuration at the input of PEDCNT 301. Other implementations will be apparent to those of skill in the art to which the present application pertains, including without limitation the use of electromechanical switches and power gating methods. In the embodiment, the voltage differential between phases A and B is 110 VAC with a single phase voltage of 63.6 VAC for each of the three phases. The difference voltage is equal to 1.73 multiplied by the voltage-per-phase. A control signal is used to turn "on" or "off" solid state switches 309 and 310 in order to control outlet unit 311. An outlet unit sense line detects when a power cord is plugged into outlet 311 and a power request signal is fed to microcontroller 308.

Microcontroller 308 evaluates the power request signal and analyzes it in conjunction with the Power AVAIL signal to determine whether power should be supplied to outlet unit 311. Phase rotation detection unit 307 determines if the three-phase power is of a normal rotation (for example, phases A, B, and C along lines 1, 2 and 3, respectively) or if the rotation has reversed (for example, phases A, C, and B along lines 1, 2 and 3, respectively). A normal rotation signifies that additional power is available. A reverse rotation signifies that the system is in a restricted power mode and that new requests for power from outlet units should be denied. If power is available, microcontroller 308 will cause solid state switches 309 and 310 to enter an ON status in response to the power request signal. If power is unavailable, as signaled by a reverse phase rotation in the embodiment, than microcontroller 308 will not permit power to be supplied to then unused outlet units, but will continue to allow power flow to outlets that are already in use when additional power became unavailable.

In a preferred embodiment, a central conversion unit (or FCU) is used to convert 115 VAC three-phase power of high-frequency (fixed or variable) to 60 Hz 110 VAC three-phase power for distribution throughout seat interface units to a number of outlet units located in the cabin of a commercial aircraft.

The central conversion unit may supply power to all of the passenger outlet units in the aircraft, or, optionally, the cabin can be split into several zones, each served by a separate central conversion unit. The central converter provides for power factor correction, harmonic control, and Electromagnetic Interference (EMI) filtering, as needed by the particular aircraft. These functions may be accomplished with a three-phase boost converter, power factor corrector and an appropriate EMI Filter. The output DC voltage of the power factor corrector stage would then be processed by an inverter to create a 60 Hz AC sine wave output in a three-phase configuration. This AC sine wave output could be of either a "Y" configuration with a NEUTRAL return and a line voltage of 110 VAC or a delta ("Δ") configuration where the line-to-line voltage is 110 VAC and no neutral connection is required. The advantage of the "Δ" configuration is the elimination of the need for an additional connection between the central converter and all of the downstream seat units, which reduces the overall system weight by eliminating the need for a wire and associated wiring harness. The wires, including the neutral wire, maybe of the same wire gage so that each wire can carry the total capacity of any one phase of power. The wire gage for an AC line in such an embodiment may optionally be 16 AWG. The weight savings from eliminating the need for an additional wire can be significant. In a typical wide-bodied aircraft, ~800 feet of wire may be eliminated, accounting for approximate 8 pounds of 16 AWG wire. Over the life cycle of the aircraft, significant cost savings from such a reduction can be achieved.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed:

1. A power distribution and management system effective to provide power to at least one outlet in a vehicle when a system "on"/"off" status is in an "on" status, comprising:
   at least one Frequency Converter Unit (FCU) configured to receive three-phase high-frequency alternating current (AC) and to output, only when the system is in an "on" status, three phase low frequency AC power to three power lines, wherein each one of the three power lines receives a different phase of the low frequency AC power;
   a microcontroller that includes an output monitor configured to individually monitor the power drawn by each one of the three power lines;
   a host processor receiving signals from vehicle systems unrelated to the at least one outlet and in communication with the output monitor; and
   the microcontroller configured to place the system in an "off" status when either the power drawn on one of the power lines exceeds a predefined threshold or the host processor instructs an "off" status.

2. The system of claim 1 wherein:
   the FCU includes a Power Factor Correction (PFC) unit and a current inversion unit;
   the PFC unit receiving the three-phase high-frequency input AC power as an input and outputting an intermediate voltage direct current (DC) to the current inversion unit;
   the current inversion unit outputting AC three phase power.

3. The system of claim 2 wherein two outlet relays, one for each of two phases of low frequency AC power, are disposed between the current inversion unit and the output monitor.

4. The system of claim 3 wherein, when the predetermined threshold is exceeded, the current inversion unit alters a status of the two outlet relays thereby rotating phases of the low frequency AC power.

5. The system of claim 4 wherein the low frequency converted power is of a delta configuration having a line-to-line voltage of 110 VAC.

6. The system of claim 4 wherein phase rotation of the low frequency AC power instructs the output monitor that no additional power is available and to place the system in an "off" status.

7. The system of claim 1
   wherein a hi-rail DC unit is disposed between the PFC unit and the inversion CPU and is configured to store a portion of the intermediate DC voltage for use following a power loss.

8. The system of claim 3 wherein the two outlet relays provide low frequency AC power to an outlet and an outlet sense line detects when a power cord is plugged into the outlet.

9. The system of claim 2, wherein the FCU is configured to perform at least one of power factor correction, harmonic control and electromagnetic interference filtering.

10. The system of claim 1, wherein the FCU includes:
    a first EMI filter configured to receive the three-phase high-frequency AC power and perform electromagnetic inference filtering;
    the PFC unit configured to perform power factor correction;
    and
    a pulse modulation unit having at least one AC inverter and a pulse modulation CPU that are together configured to output the converted power.

11. The system of claim 1, wherein a Passenger Electronic Device Controller (PEDCNT) receives the low frequency AC power and includes:
    an EMI filter configured to receive the low frequency AC power and perform electromagnetic interference filtering;
    a ground fault interrupter; and
    the microcontroller the output monitor configured to control the supply of power to the outlet units.

12. The system of claim 10, wherein a Passenger Electronic Device Controller (PEDCNT) receives the low frequency AC power and includes:
    a second EMI filter configured to receive the low frequency AC power and perform electromagnetic interference filtering;
    a ground fault interrupter; and a
    the microcontroller the output monitor configured to control the supply of power to the outlet units.

13. A method of distributing and managing power on a vehicle, comprising the steps of:
    receiving three-phase high-frequency AC power;

converting the three-phase high-frequency AC power to three-phase low frequency converted AC power;

distributing the three-phase low-frequency AC power to a plurality of outlet units;

monitoring the amount of three-phase low-frequency AC power drawn by the plurality of outlet units and monitoring vehicle systems unrelated to plurality of outlet units; and denying low-frequency AC power to not in use ones of the plurality of outlet units when either the power drawn by the outlets exceeds a preset threshold or the vehicle systems status is indicative of denial of power.

14. The method of claim 13 wherein:

the three-phase high-frequency AC power is selected from the group consisting of 115 Volt Alternating Current (VAC) 400 Hz three-phase power, 115 VAC 360-380 Hz three-phase power, 230 VAC 400 Hz three-phase power and 230 VAC 360-380 Hz three-phase power; and the three-phase low-frequency power is 110 VAC 60 Hz; and wherein the step of converting the three-phase high frequency AC power into three-phase low-frequency AC power includes first converting the three-phase high-frequency AC power to an intermediate voltage DC power by providing, from each of three Power Factor Correction (PFC) subunits, current at 350 volts potential to a high rail DC unit.

15. The method of claim 13 wherein the distribution of the converted power is accomplished through at least one outlet assembly.

16. The method of claim 13 wherein the three-phase high-frequency AC power is generated by a generator driven by an aircraft engine and the outlet units are consumer power outlets on a commercial aircraft.

17. The method of claim 16 wherein a Frequency Converter Unit (FCU), is configured to cause to be disabled any unused ones of the outlet units when no additional power is available.

18. The method of claim 13, including the further steps of:

electrically interconnecting a plurality of power lines, one associated with each respective phase of the three-phase low-frequency power, to the plurality of outlet units;

comparing the power drawn through the outlet units to a preset threshold; and interchanging the power line associated with two of the three phases if the power drawn exceeds the preset threshold signaling that the not in use outlet units are to be disabled.

19. The method of claim 17, wherein the FCU contains a threshold compare circuit configured to perform the step of comparing and a Passenger Electronic Device Controller (PEDCNT) contains a phase rotation detection unit.

20. The method of claim 19, further comprising the steps of:

determining using the FCU a current status of whether additional power is available;

wherein each PEDCNT is configured to respond to a power request signal and respond to at least one additional parameter that is unrelated to whether additional power is available when additional power is available;

if additional power is available, supplying power to outlet units from which a power request signal is received; and if additional power is unavailable, withholding power to outlet units from which a power request signal is received.

21. The method of claim 20, further comprising the step of performing, using the FCU, at least one of power factor correction, harmonic control and electromagnetic interference filtering.

* * * * *